United States Patent
Li et al.

(10) Patent No.: US 12,341,414 B2
(45) Date of Patent: Jun. 24, 2025

(54) POWER SUPPLY SYSTEM AND METHOD OF OPERATING THE SAME

(71) Applicant: Telefonaktiebolaget LM Ericsson (publ), Stockholm (SE)

(72) Inventors: Donghao Li, Beijing (CN); Ying Cao, Beijing (CN); Huajuan Xiao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 234 days.

(21) Appl. No.: 17/919,620

(22) PCT Filed: Apr. 30, 2020

(86) PCT No.: PCT/CN2020/088216
§ 371 (c)(1),
(2) Date: Oct. 18, 2022

(87) PCT Pub. No.: WO2021/217569
PCT Pub. Date: Nov. 4, 2021

(65) Prior Publication Data
US 2023/0146270 A1 May 11, 2023

(51) Int. Cl.
*H02M 1/32* (2007.01)
*H02M 1/00* (2006.01)
(Continued)

(52) U.S. Cl.
CPC ........... *H02M 1/0096* (2021.05); *H02M 1/32* (2013.01); *H02M 1/36* (2013.01); *H02M 3/07* (2013.01)

(58) Field of Classification Search
CPC ........ H02M 1/0096; H02M 1/12; H02M 1/14; H02M 1/15; H02M 1/32; H02M 1/34; H02M 1/342; H02M 1/344
See application file for complete search history.

(56) References Cited

U.S. PATENT DOCUMENTS 6,504,497 B2 * 1/2003 Jang ................... H02J 7/345
                                                      363/39
9,337,744 B1  5/2016 Tsyrganovich
(Continued)

FOREIGN PATENT DOCUMENTS

CN         1179240 A     4/1998
CN       201022180 Y     2/2008
(Continued)

OTHER PUBLICATIONS

International Search Report and Written Opinion of the International Searching Authority, PCT/CN2020/088216, mailed Feb. 2, 2021, 8 pages.
(Continued)

*Primary Examiner* — Gary L Laxton
(74) *Attorney, Agent, or Firm* — Sage Patent Group

(57) ABSTRACT

The present disclosure provides a power supply system, including: a power source connected between a first node and a second node for applying an input voltage; a first circuit, connected between the first node and a second circuit; and configured to suppress oscillation caused by load variation of a load circuit that is connected between the first node and the second circuit, and to supply power to the load circuit when the power source is temporarily off; the second circuit, having a first port connected to the first circuit, a second port connected to the load circuit, and a third port connected to the second node; and configured to charge the first circuit and supply power to the load circuit; and a third circuit, connected between the first circuit and the load circuit; and configured to suppress a current flowing into the second circuit.

20 Claims, 6 Drawing Sheets

(51) Int. Cl.
  *H02M 1/36*   (2007.01)
  *H02M 3/07*   (2006.01)

(56) References Cited

U.S. PATENT DOCUMENTS

| | | |
|---|---|---|
| 2002/0175638 A1 | 11/2002 | Nerone et al. |
| 2008/0007976 A1 | 1/2008 | Mizuno |
| 2014/0002145 A1 | 1/2014 | Mauder et al. |
| 2017/0271975 A1* | 9/2017 | Plojhar .................. H02M 1/32 |
| 2020/0382004 A1* | 12/2020 | Chan ........................ H02M 7/04 |

FOREIGN PATENT DOCUMENTS

| | | |
|---|---|---|
| CN | 206894497 U | 1/2018 |
| EP | 3276821 A1 | 1/2018 |
| WO | 2016100891 A1 | 6/2016 |
| WO | WO 2019/134670 A1 | 7/2019 |

OTHER PUBLICATIONS

Search Report, European Patent Application No. 20933125.5, mailed Feb. 1, 2024, 9 pages.

\* cited by examiner

POWER SUPPLY SYSTEM AND METHOD OF OPERATING THE SAME

CROSS REFERENCE TO RELATED APPLICATIONS

This application is a 35 U.S.C. § 371 national stage application of PCT International Application No. PCT/CN2020/088216 filed on Apr. 30, 2020, the disclosure and content of which is incorporated by reference herein in its entirety.

TECHNICAL FIELD

The present disclosure generally relates to the technical field of electronic technology, and in particular, to a power supply system and a method of operating the power supply system.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Some of communication devices, such as Radio Units (RUs), work with a load circuit with dynamic load, which may cause oscillation of the input voltage and the input current from a power supply system. Thus, a capacitor with a larger value capacitance (e.g., 8 mF), also called a holdup capacitor, is necessary to be introduced in the power supply system to suppress the oscillation caused by the dynamic load of the load circuit and supply power to the load circuit when the power source (e.g. denoted as 100, as shown in FIG. 1) is temporarily off. On the other hand, however, the holdup capacitor may cause a surge current in the power supply system.

Generally, a power supply assisting sub-system as shown in FIG. 1, e.g., a hot swap circuit, is used in the power supply system to suppress the input surge current when the communication device is powered on.

As shown in FIG. 1, a power supply system 10 includes a power source 100, a power supply assisting sub-system 101, and a control logic 102, and is configured to supply power to a load circuit 11 of a communication device (not shown).

The power supply assisting sub-system 101 includes a holdup capacitor (denoted as $C_{holdup}$), two Metal-Oxide-Semiconductor Field-Effect Transistors (MOSFETs, denoted as $Q_1$ and $Q_2$ respectively), two resistors (denoted as $R_{s1}$ and $R_{s2}$ respectively), and a filtering capacitor (denoted as $C_o$). In the power supply assisting sub-system 101, the holdup capacitor $C_{holdup}$ and the filtering capacitor $C_o$ are respectively connected in parallel with the load circuit 11, which is connected between Node 1 ($V_{in}+$) and the transistor $Q_1/Q_2$; the transistor $Q_1$ is connected to the holdup capacitor $C_{holdup}$ and to Node 2 ($V_{in}-$) via $R_{s1}$, respectively; and the transistor $Q_2$ is connected to the holdup capacitor $C_{holdup}$ and to Node 2 ($V_{in}-$) via $R_{s2}$, respectively. Here, the voltage difference between Node 1 and Node 2 that is applied by the power source 100 is the input voltage, denoted as $V_{in}$.

The holdup capacitor $C_{holdup}$ is used for suppressing the oscillation caused by the dynamic load of the load circuit 11 and supplying power to the load circuit 11 when the power source $V_{in}$ is temporarily off, and has a capacitance much larger than that of the filtering capacitor $C_o$, which is used for filtering interference to the load circuit 11.

The transistor $Q_1$ may be a big Safe Operating Area (SOA) FET that may be used for linear charging the holdup capacitor $C_{holdup}$ to suppress the surge current while the communication device, such as an RU, is powered on. The transistor $Q_2$ may be a low Reducing Drain-Source On-resistance Rdson FET, and may be used for assisting to supply power to the load circuit 11 when the power supply system 10 is in a normal operation. The resistor $R_{s1}$ that is in series with the transistor $Q_1$ has a resistance much larger than that of the resistor $R_{s2}$ that is in series with the transistor $Q_2$.

The control logic 102 is schematically shown to illustrate a control principle of controlling the power supply assisting sub-system 101, which may be implemented in any of appropriate ways. Here, $V_{gs1}$ and $V_{gs2}$ are control signals for controlling ON/OFF of the transistors $Q_1$ and $Q_2$, respectively. Herein, N-type transistors are taken as an example for illustration only. Thus, the N-type transistors $Q_1$ and $Q_2$ are respectively turned on by $V_{gs1}$ and $V_{gs2}$ in a high level, and turned off by $V_{gs1}$ and $V_{gs2}$ in a low level. For P-type transistors, although not described herein, it will be understood that the difference between description on P-type transistors and N-type transistors only consists in that the P-type transistors $Q_1$ and $Q_2$ are respectively turned on by $V_{gs1}$ and $V_{gs2}$ in a low level, and turned off by $V_{gs1}$ and $V_{gs2}$ in a high level.

Here, $V_{RS1}$ ($=I_1*R_{s1}$), $V_{RS2}$ ($=I_2*R_{s2}$), and Vass represent feedback signals from the power supply assisting sub-system 101, wherein $V_{RS1}$ ($=I_1*R_{s1}$) is associated with the current $I_1$ flowing through the transistor $Q_1$, $V_{RS2}$ ($=I_2*R_{s2}$) is associated with the current $I_2$ flowing through the transistor $Q_2$; and $V_{ds\_s}$ represents a signal for sensing a voltage difference, denoted as $V_{ds}$, between the input voltage $V_{in}$ and the voltage, denoted as $V_{holdup}$, across the holdup capacitor ($C_{holdup}$), i.e., $V_{ds}=V_{in}-V_{holdup}$. Thus, $V_{ds\_s}$ represents a signal for characterizing $V_{ds}$. When $V_{ds}$ is smaller than a preset reference threshold ($V_{ds\_th}$), the transistor $Q_2$ is triggered by $V_{ds\_s}$ to be turned on by $V_{gs2}$. The magnitude of $V_{gs1}$ depends on that of $V_{RS1}$. When $V_{RS1}$ is larger, $V_{RS1}$ pulls the magnitude of $V_{gs1}$ down. Once $V_{gs1}$ is decreased, the flow capability of the transistor $Q_1$ is reduced, which in turn causes the current $I_1$ to be reduced. A smaller $V_{gs1}$ (e.g. in a middle level) may enable the transistor $Q_1$ to operate in the linear mode, wherein the current $I_1$ is proportional to $V_{RS1}$. In the linear mode, the transistor $Q_1$ charges the holdup capacitor ($C_{holdup}$).

Hereinafter, the operating principle of the power supply assisting sub-system 101 will be described in conjunction with FIG. 2. FIG. 2 schematically shows an operating timing sequence diagram of the power supply assisting sub-system 101.

$t_0$: The power supply system 10 starts to supply power to the communication device (not shown).

$t_1$~$t_2$: The transistor $Q_1$ is turned on by $V_{gs1}$ in e.g. a middle level (which causes the transistor $Q_1$ to operate in the linear mode), and the capacitor $C_{holdup}$ is linear charged through the transistor $Q_1$, wherein the charging current is limited to the current $I_1$ (a gray line as shown in FIG. 2) by comparing $V_{RS1}$ ($=I_1*R_{s1}$) to a preset reference of control.

$t_2$: When $V_{ds}$ (=$V_{in}$-$V_{holdup}$) is smaller than $V_{ds\_th}$ (a preset reference threshold), the transistor $Q_2$ is triggered to be turned on by $V_{gs2}$.

$t_2$~$t_3$: When the transistor $Q_2$ is turned on at $t_2$, the current flows through the transistor $Q_2$ (as seen from FIG. 2, $I_2$ that is shown in a black line has a peak during $t_2$~$t_3$) but almost does not flow through the transistor $Q_1$ any more (as seen from FIG. 2, $I_1$ that is shown in a gray line is decreased to nearly zero during $t_2$~$t_3$), since the resistor $R_{s1}$ that is in series with the transistor $Q_1$ has a resistance much larger than that of the resistor $R_{s2}$. The capacitor $C_{holdup}$ is quickly charged to $V_{in}$ by the current $I_2$, which is small since $V_{ds}$ (=$V_{in}$-$V_{holdup}$) is small at $t_2$. Meanwhile, $V_{RS1}$ (=$I_1$*$R_{s1}$) is reduced and may not pull $V_{gs1}$ down any more. Consequently, $V_{gs1}$ boosts up to its original high level at $t_3$, and thus the transistor $Q_1$ enters a switching mode at $t_3$.

$t_3$~$t_4$: The power supply of the power supply system 10 is normal at $t_3$ with the assistance of the power supply assisting sub-system 101, and thus a signal indicating power good is sent out. Accordingly, after a shorter delay at $t_4$, the load circuit 11 of the communication device works normally under the good power supply of the power supply system 10 with the assistance of the power supply assisting sub-system 101.

However, the power supply assisting sub-system 101 as shown in FIG. 1 has some drawbacks:

1. When there is overshoot of the input voltage $V_{in}$ or the input current $I_{in}$, or the power supply assisting sub-system works in a hiccup mode, i.e., repetitive ON and OFF due to the abnormal load, there will be a large input surge current.

2. During the normal operation, the transistor $Q_2$ can't be turned off, since the limited current $I_1$ of the transistor $Q_1$ is too small to support the load current (i.e., the communication device cannot work) after the transistor $Q_2$ is off. Since the transistor $Q_2$ is always on during the normal operation of the communication device, the surge current, if appears due to some reasons as mentioned above, would almost flow through the transistor $Q_2$ only. However, the transistor $Q_2$ can't suppress the surge current, since it does not have such a current limitation function as the transistor $Q_1$ has.

3. Due to the above reasons, very big SOA FETs must be used in the power supply assisting sub-system of the power supply system to sustain the surge current, which increases cost.

For example, if lighting attacks an RU's input port, the input residual voltage could be two times larger than normal operating voltage, it also induces the input surge current as large as hundreds Ampere if there are holdup capacitors with large capacitance. The components used must have higher ratio values to sustain the high voltage and the high current, which increases cost and reduces performance and reliability.

Therefore, a power supply system having a power supply assisting sub-system that can suppress the surge current due to the overshoot of voltage or current is desired.

SUMMARY

In order to solve or at least alleviate the problems as discussed above, the present disclosure provides technical solutions for suppressing the surge current due to the overshoot of voltage or current as follows.

According to a first aspect of the present disclosure, a power supply system is provided. The power supply system includes: a power source connected between a first node and a second node for applying an input voltage; a first circuit, connected between the first node and a second circuit; and configured to suppress oscillation caused by load variation of a load circuit that is connected between the first node and the second circuit, and to supply power to the load circuit when the power source is temporarily off; the second circuit, having a first port connected to the first circuit, a second port connected to the load circuit, and a third port connected to the second node; and configured to charge the first circuit and supply power to the load circuit; and a third circuit, connected between the first circuit and the load circuit; and configured to suppress a current flowing into the second circuit.

In an exemplary embodiment, the power supply system further includes: a fourth circuit, connected between the first node and the load circuit, and configured to filter interference to the load circuit.

In an exemplary embodiment, the first circuit includes a first capacitor, having a first electrode connected to the first node and a second electrode connected to the first port of the second circuit.

In an exemplary embodiment, the filtering circuit includes a second capacitor, having a first electrode connected to the first node and a second electrode connected to the second port of the second circuit.

In an exemplary embodiment, the second circuit includes: a first transistor, having a control terminal, a first terminal connected to the second node via a first resistor, and a second terminal, as the first port, connected to the second electrode of the first capacitor; a second transistor, having a control terminal, a first terminal connected to the second node via a second resistor, and a second terminal, as the second port, connected to the load circuit; the first resistor connected between the second node and the first terminal of the first transistor; and the second resistor connected between the second node and the first terminal of the second transistor, wherein the first resistor has a resistance larger than that of the second resistor.

In an exemplary embodiment, the third circuit includes: a third transistor, having a control terminal, a first terminal connected to the second terminal of the second transistor, and a second terminal connected to the second electrode of the first capacitor.

In an exemplary embodiment, the control terminals of the first transistor, the second transistor, and the third transistor respectively correspond to gate electrodes of the first transistor, the second transistor, and the third transistor; the first terminal of each of the first transistor, the second transistor, and the third transistor corresponds to one of a source electrode and a drain electrode of the corresponding one of the first transistor, the second transistor, and the third transistor; and the second terminal of each of the charging circuit, the second transistor, and the third transistor corresponds to the other of the source electrode and the drain electrode of the corresponding one of the first transistor, the second transistor, and the third transistor.

In an exemplary embodiment, the first transistor, the second transistor, and the third transistor are N-type transistors, each configured to be turned on by a high level control signal at the control terminal, and turned off by a low level control signal at the corresponding control terminal.

In an exemplary embodiment, the first transistor, the second transistor, and the third transistor are P-type transistors, each configured to be turned on by a low level control signal at the control terminal, and turned off by a high level control signal at the corresponding control terminal.

In an exemplary embodiment, the first transistor is configured to be turned on by a control signal at the control terminal of the first transistor to charge the first capacitor, when the input voltage is normal; and the second transistor is configured to be turned on by a control signal at the control terminal of the second transistor to supply power to the load circuit, if a voltage difference between the input voltage and a voltage across the first capacitor is smaller than a preset voltage threshold.

In an exemplary embodiment, the third transistor is configured to be turned off by a control signal at the control terminal of the third transistor to suppress a current flowing through the second transistor, if the current flowing through the second transistor is not smaller than a preset Over-Current (OC) threshold.

In an exemplary embodiment, the third transistor is kept off for a first predetermined period since the current flowing through the second transistor is smaller than the preset OC threshold; and is turned on by the control signal at the control terminal of the third transistor when the first predetermined period is expired.

In an exemplary embodiment, the first predetermined period includes a hiccup period of Over-Current Protection (OCP).

In an exemplary embodiment, if a voltage across the second capacitor is not smaller than a first preset Over-Voltage (OV) threshold, the first transistor and the second transistor are configured to be turned off respectively by respective control signals at the control terminals of the first transistor and the second transistor, and a signal for sensing the voltage difference is disabled.

In an exemplary embodiment, if the voltage across the second capacitor is not larger than a second preset OV threshold, the first transistor and the second transistor are configured to be turned on respectively by the respective control signals at the control terminals of the first transistor and the second transistor, wherein the second preset OV threshold is smaller than the first OV threshold.

In an exemplary embodiment, if a voltage across the second capacitor is not smaller than a first preset OV threshold, the first transistor, the second transistor and the third transistor are configured to be turned off respectively by respective control signals at the control terminals of the first transistor, the second transistor and the third transistor, and a signal for sensing the voltage difference is disabled.

In an exemplary embodiment, if the voltage across the second capacitor is not larger than a second preset OV threshold, the first transistor, the second transistor, and the third transistor are configured to be turned on respectively by the respective control signals at the control terminals of the first transistor, the second transistor and the third transistor, wherein the second preset OV threshold is smaller than the first OV threshold.

In an exemplary embodiment, the signal is enabled when a second predetermined period since the second transistor is controlled to be turned on is expired.

In an exemplary embodiment, the second predetermined period is a period for the first capacitor being fully charged by the current flowing through the second transistor.

According to a second aspect of the present disclosure, a method of operating the power supply system according to the first aspect is provided. The method includes: turning on the first transistor by a control signal at the control terminal of the first transistor to charge the first capacitor, when the input voltage is normal; and turning on the second transistor by a control signal at the control terminal of the second transistor to supply power to the load circuit, if a voltage difference between the input voltage and a voltage across the first capacitor is smaller than a preset voltage threshold.

In an exemplary embodiment, the method further includes: turning off the third transistor by a control signal at the control terminal of the third transistor to suppress a current flowing through the second transistor, if the current flowing through the second transistor is not smaller than a preset OC threshold.

In an exemplary embodiment, the method further includes: keeping the third transistor off for a first predetermined period since the current flowing through the second transistor is smaller than the preset OC threshold; and turning on the third transistor by the control signal at the control terminal of the third transistor when the first predetermined period is expired.

In an exemplary embodiment, the first predetermined period includes a hiccup period of OCP.

In an exemplary embodiment, the method further includes: if a voltage across the second capacitor is not smaller than a first preset OV threshold, turning off the first transistor and the second transistor respectively by respective control signals at the control terminals of the first transistor and the second transistor, and disabling a signal for sensing the voltage difference.

In an exemplary embodiment, the method further includes: if the voltage across the second capacitor is not larger than a second preset OV threshold, turning on the first transistor and the second transistor respectively by the respective control signals at the control terminals of the first transistor and the second transistor, wherein the second preset OV threshold is smaller than the first OV threshold.

In an exemplary embodiment, the method further includes: if a voltage across the second capacitor is not smaller than a first preset OV threshold, turning off the first transistor, the second transistor and the third transistor respectively by respective control signals at the control terminals of the first transistor, the second transistor and the third transistor, and disabling a signal for sensing the voltage difference.

In an exemplary embodiment, the method further includes: if the voltage across the second capacitor is not larger than a second preset OV threshold, turning on the first transistor, the second transistor and the third transistor respectively by the respective control signals at the control terminals of the first transistor, the second transistor and the third transistor, wherein the second preset OV threshold is smaller than the first OV threshold.

In an exemplary embodiment, the method further includes: enabling the signal when a second predetermined period since the second transistor is controlled to be turned on is expired.

In an exemplary embodiment, the second predetermined period is a period for the first capacitor being fully charged by the current flowing through the second transistor.

The technical solutions of the present disclosure may achieve at least the following beneficial technical effects:
- the surge current during both powering on and normal operation period can be suppressed;
- smaller SOA FETs can be used to reduce cost; and
- Over-Voltage Protection (OVP) and OCP functions can be added more reliably.

BRIEF DESCRIPTION OF THE DRAWINGS

The objects, advantages and characteristics of the present disclosure will be more apparent, according to descriptions of preferred embodiments in connection with the drawings, in which.

Figure 1:
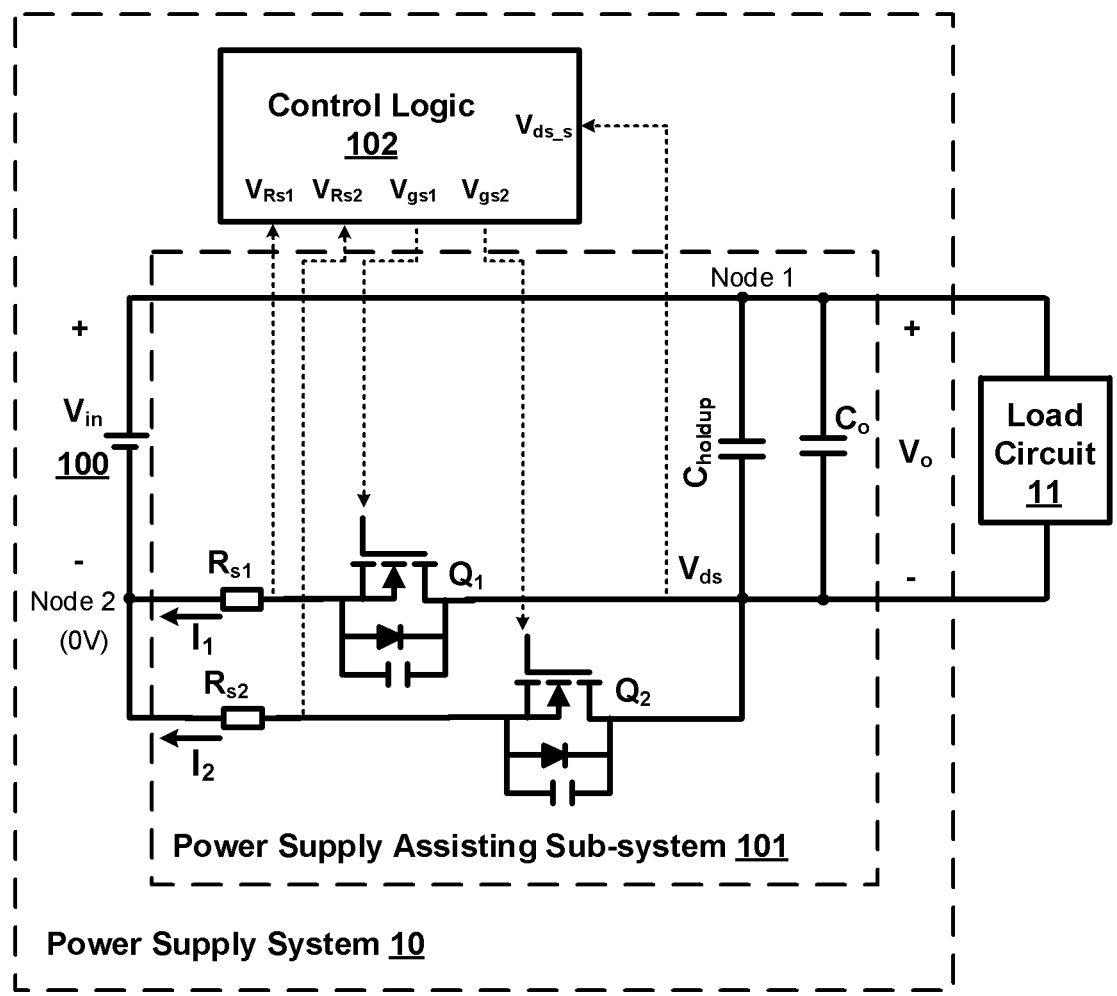
FIG. 1 schematically shows a structure of a power supply system in the prior art.

It should be noted that throughout the drawings, same or similar reference numbers are used for indicating same or similar elements; various parts in the drawings are not drawn to scale, but only for an illustrative purpose, and thus should not be understood as any limitations and constraints on the scope of the present disclosure.

DETAILED DESCRIPTION

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Those skilled in the art will appreciate that the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. It will be also understood that the terms "connect(s)," "connecting", "connected", etc. when used herein, just means that there is an electrical or communicative connection between two elements and they can be connected either directly or indirectly, unless explicitly stated to the contrary.

Conditional language used herein, such as "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below. In addition, language such as the phrase "at least one of X, Y and Z," unless specifically stated otherwise, is to be understood with the context as used in general to convey that an item, term, etc. may be either X, Y, or Z, or a combination thereof.

Although multiple embodiments of the present disclosure will be described in the following detailed description in conjunction with the accompanying drawings, it should be understood that the present disclosure is not limited to the described embodiments, but instead is also capable of numerous rearrangements, modifications, and substitutions without departing from the present disclosure that as will be set forth and defined within the claims.

Further, it should be noted that although the following description of some embodiments of the present disclosure is given in the context of power supply system of a communication device, the present disclosure is not limited thereto.

The basic principle of the present disclosure consists in that a current suppression circuit is introduced in the power supply assisting sub-system of the power supply system for supplying power to the communication device, so that the surge current can be suppressed by enabling/disabling the current suppression circuit, without impacting the normal working of the communication device.

Hereinafter, a structure of a power supply system according to an embodiment of the present disclosure will be described in detail with reference to FIG. 3.

Figure 3:
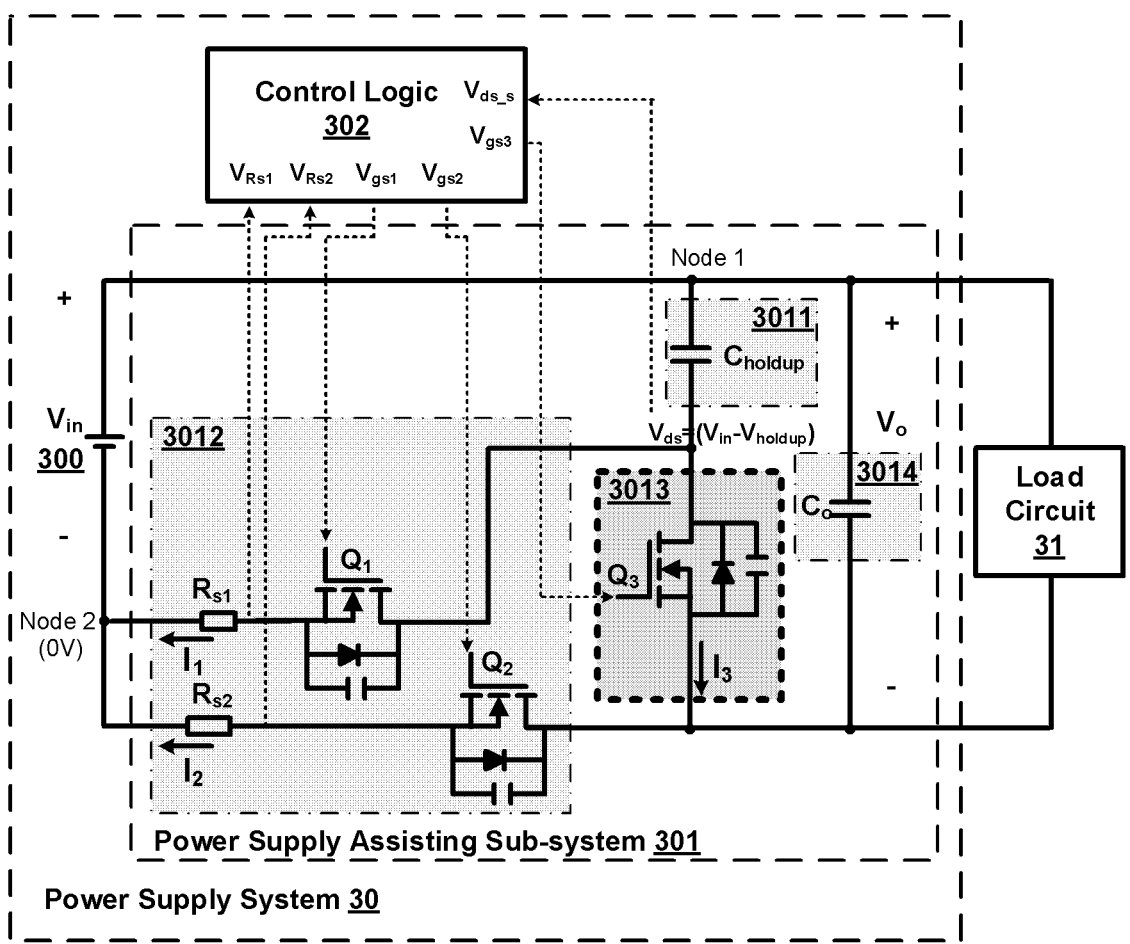
FIG. 3 schematically shows a structure of a power supply system according to an embodiment of the present disclosure.

FIG. 3 schematically shows the structure of the power supply system 30 according to the embodiment of the present disclosure.

As shown in FIG. 3, the power supply system 30 includes a power source 300, a power supply assisting sub-system 301, and a control logic 302.

In particular, the power source 300 is connected between Node 1 ($V_{in+}$) and Node 2 ($V_{in-}$) for applying an input voltage $V_{in}$. For example, Node 2 may be 0V or grounded.

The power supply assisting sub-system 301 is connected between Node 1 ($V_{in+}$) and Node 2 ($V_{in-}$), and is configured to assist to supply power to a load circuit 31 of a communication device (not shown) under control of the control logic 302.

The control logic 302 is schematically shown to illustrate a control principle of controlling the power supply assisting sub-system 301, which may be implemented in any of appropriate ways.

In an exemplary embodiment, the power supply assisting sub-system 301 may include:

a first circuit 3011, connected between Node 1 ($V_{in+}$) and a second circuit 3012, wherein the first circuit 3011 is configured to suppress oscillation caused by load variation of a load circuit 31 that is connected between the Node 1 ($V_{in+}$) and the second circuit 3012, and to supply power to the load circuit 31 when the power source 300 is temporarily off;

the second circuit 3012, having a first port connected to the first circuit 3011, a second port connected to the load circuit 31, and a third port connected to Node 2 ($V_{in-}$), wherein the second circuit 3012 is configured to charge the first circuit 3011 and supply power to the load circuit 31; and a third circuit 3013, connected between the first circuit 3011 (i.e., the first port of the second circuit 3012) and the load circuit 31 (i.e., the second port of the second circuit 3012), wherein the third circuit 3013 is configured to suppress a current flowing into the second circuit 3012.

Alternatively, the power supply assisting sub-system 301 may further include: a fourth circuit 3014 connected between Node 1 ($V_{in+}$) and the load circuit 31, wherein the fourth circuit 3014 is configured to filter interference to the load circuit 31.

In an exemplary embodiment, the first circuit 3011 may include a capacitor $C_{holdup}$, which has a first electrode connected to Node 1 ($V_{in+}$) and a second electrode connected to the second circuit 3012.

In an exemplary embodiment, the second circuit 3012 may include: a first transistor $Q_1$, a second transistor $Q_2$, a first resistor $R_{s1}$, and a second resistor $R_{s2}$.

In particular, the first transistor $Q_1$ has a control terminal, a first terminal connected to Node 2 ($V_{in-}$) via the first resistor $R_{s1}$, and a second terminal (corresponding to the first port of the second circuit 3012) connected to the second electrode of the capacitor $C_{holdup}$; the second transistor $Q_2$ has a control terminal, a first terminal connected to Node 2 ($V_{in-}$) via the second resistor $R_{s2}$, and a second terminal (corresponding to the second port of the second circuit 3012) connected to the load circuit 31; the first resistor ($R_{s1}$) is connected between Node 2 ($V_{in-}$) and the first terminal of the first transistor $Q_1$; and the second resistor $R_{s2}$ is connected between Node 2 ($V_{in-}$) and the first terminal of the second transistor $Q_2$. Here, the first resistor $R_{s1}$ has a resistance much larger than that of the second resistor $R_{s2}$.

In an exemplary embodiment, the third circuit 3013 may include a third transistor $Q_3$, which has a control terminal, a first terminal connected to the second terminal of the second transistor $Q_2$, and a second terminal connected to the second electrode of the capacitor $C_{holdup}$.

It may be understood that the control terminals of the first transistor $Q_1$, the second transistor $Q_2$, and the third transistor $Q_3$ respectively correspond to gate electrodes of the first transistor $Q_1$, the second transistor $Q_2$, and the third transistor $Q_3$; the first terminal of each of the first transistor $Q_1$, the second transistor $Q_2$, and the third transistor $Q_3$ corresponds to one of a source electrode and a drain electrode of the corresponding one of the first transistor $Q_1$, the second transistor $Q_2$, and the third transistor $Q_3$, and the second terminal of each of the charging circuit $Q_1$, the second transistor $Q_2$, and the third transistor $Q_3$ corresponds to the other of the source electrode and the drain electrode of the corresponding one of the first transistor $Q_1$, the second transistor $Q_2$, and the third transistor $Q_3$.

The control logic 302 is schematically shown to illustrate a control principle of controlling the power supply assisting sub-system 301, which may be implemented in any of appropriate ways. In the control logic 302, $V_{gs1}$, $V_{gs2}$, and $V_{gs3}$ are control signals for controlling ON/OFF of the transistors $Q_1$, $Q_2$, and $Q_3$ respectively. Herein, N-type transistors are taken as an example for illustration only. Thus, the N-type transistors $Q_1$, $Q_2$, and $Q_3$ are respectively turned on by $V_{gs1}$, $V_{gs2}$, and $V_{gs3}$ in a high level, and turned off by $V_{gs1}$, $V_{gs2}$, and $V_{gs3}$ in a low level. For P-type transistors, although not described herein, it will be understood that the difference between description on P-type transistors and N-type transistors only consists in that the P-type transistors $Q_1$, $Q_2$, and $Q_3$ are respectively turned on by $V_{gs1}$, $V_{gs2}$, and $V_{gs3}$ in a low level, and turned off by $V_{gs1}$, $V_{gs2}$, and $V_{gs3}$ in a high level.

In addition, $V_{RS1}$ ($=I_1*R_{S1}$), $V_{RS2}$ ($=I_2*R_{s2}$), and $V_{ds\_s}$ in the control logic 302 represent feedback signals from the power supply assisting sub-system 301, wherein $V_{RS1}$ ($=I_1*R_{s1}$) is associated with the current $I_1$ flowing through the transistor $Q_1$, $V_{RS2}$ ($=I_2*R_{s2}$) is associated with the current $I_2$ flowing through the transistor $Q_2$; and $V_{ds}$ s represents a signal for sensing a voltage difference, denoted as $V_{ds}$, between the input voltage $V_{in}$ and the voltage, denoted as $V_{holdup}$, across the capacitor $C_{holdup}$, i.e., $V_{ds}=V_{in}-V_{holdup}$. Thus, $V_{ds\_s}$ represents a signal for characterizing $V_{ds}$. When $V_{ds}$ is smaller than a preset reference threshold ($V_{ds\_th}$), the transistor $Q_2$ is triggered by $V_{ds\_s}$ to be turned on by $V_{gs2}$. The magnitude of $V_{gs1}$ depends on that of $V_{RS1}$. When $V_{RS1}$ is larger, $V_{RS1}$ may pull the magnitude of $V_{gs1}$ down. Once $V_{gs1}$ is decreased, the flow capability of the transistor $Q_1$ is reduced, which in turn causes the current $I_1$ to be reduced. A smaller $V_{gs1}$ (e.g. in a middle level) may enable the transistor $Q_1$ to operate in the linear mode, wherein the current $I_1$ is proportional to $V_{RS1}$. In the linear mode, the transistor $Q_1$ charges the capacitor $C_{holdup}$.

In an exemplary embodiment, the fourth circuit 3014 may include a capacitor $C_o$, which has a first electrode connected to the first node ($V_{in+}$) and a second electrode connected to the second port of the second circuit 3012, i.e., the second terminal of the second transistor $Q_2$.

Although in the above exemplary embodiments, the first circuit 3011, the second circuit 3012, the third circuit 3013, and the fourth circuit 3014 are embodied to respectively include particular element(s), the present disclosure does not limited to these. It should be understood that any circuit structures with any possible combinations of elements that may achieve the functions of the first circuit 3011, the second circuit 3012, the third circuit 3013, and the fourth circuit 3014 fall into the scope of the present disclosure, either.

The description below will be made by taking the above particular implementations of the first circuit 3011, the second circuit 3012, the third circuit 3013, and the fourth circuit 3014 as an example, which is for illustration only without any limitations, as understood by the skilled in the art.

Figure 2:
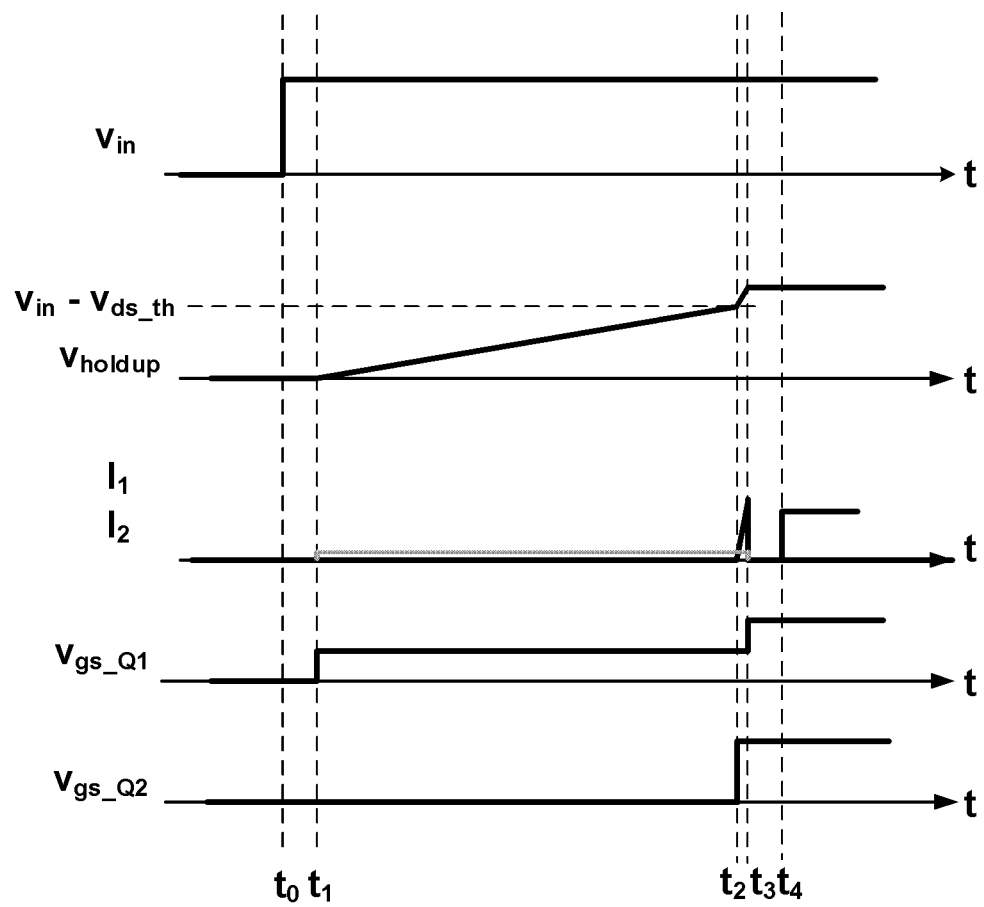
FIG. 2 schematically shows an exemplary operating timing sequence diagram of a power supply assisting sub-system included in the power supply system of FIG. 1.

In an exemplary embodiment, when the power supply system 30 starts to supply power to the communication device (not shown), and the input voltage $V_{in}$ is normal, the first transistor $Q_1$ is configured to be turned on by the control signal ($V_{gs1}$) in e.g. a middle level (which causes the transistor $Q_1$ to operate in the linear mode) at the control terminal of the first transistor $Q_1$ to charge the capacitor $C_{holdup}$, like the process during $t_1$~$t_2$ as shown in FIG. 2.

If the voltage difference $V_{ds}$ between the input voltage $V_{in}$ and a voltage, denoted as $V_{holdup}$, across the capacitor $C_{holdup}$ is smaller than the preset voltage threshold $V_{ds}$ th, the second transistor $Q_2$ is configured to be turned on by the control signal ($V_{gs2}$) in a high level at the control terminal of the second transistor $Q_2$ to supply power to the load circuit 31. Like the process during $t_2$~$t_4$ as shown in FIG. 2, when the transistor $Q_2$ is turned on at $t_2$, the current flows through the transistor $Q_2$ (as seen from FIG. 2, 12 that is shown in a black line has a peak during $t_2$~$t_3$) but almost does not flow through the transistor $Q_1$ any more (as seen from FIG. 2, $I_1$ that is shown in a gray line is decreased to nearly zero during $t_2$~$t_3$), since the resistor $R_{s1}$ that is in series with the transistor $Q_1$ has a resistance much larger than that of the resistor $R_{s2}$. The capacitor $C_{holdup}$ is quickly charged to $V_{in}$ by the current $I_2$, which is small since $V_{ds}$ (=$V_{in}$−$V_{holdup}$) is small at $t_2$. Meanwhile, $V_{RS1}$ (=$I_1$*$R_{s1}$) is reduced and may not pull $V_{gs1}$ down any more. Consequently, $V_{gs1}$ boosts up to its original high level at $t_3$, and thus the transistor $Q_1$ enters a switching mode at $t_3$. At $t_3$, the power supply of the power supply system 30 is normal with the assistance of the power supply assisting sub-system 301, and thus a signal indicating power good is sent out. Accordingly, after a shorter delay at $t_4$, the load circuit 31 of the communication device works normally under the good power supply of the power supply system 30 with the assistance of the power supply assisting sub-system 301.

Hereinafter, it will be described in conjunction with FIG. 4 and FIG. 5 respectively how the power supply assisting sub-system 301 according to the above embodiments of the present disclosure may alleviate or even eliminate the negative effects of a larger surge current caused by overshoot of the input voltage $V_{in}$ or the input current $I_{in}$, or the power supply assisting sub-system 301 working in a hiccup mode (i.e., repetitive ON and OFF due to the abnormal load), on the power supply assisting sub-system 301, especially on the second transistor $Q_2$.

Figure 4:
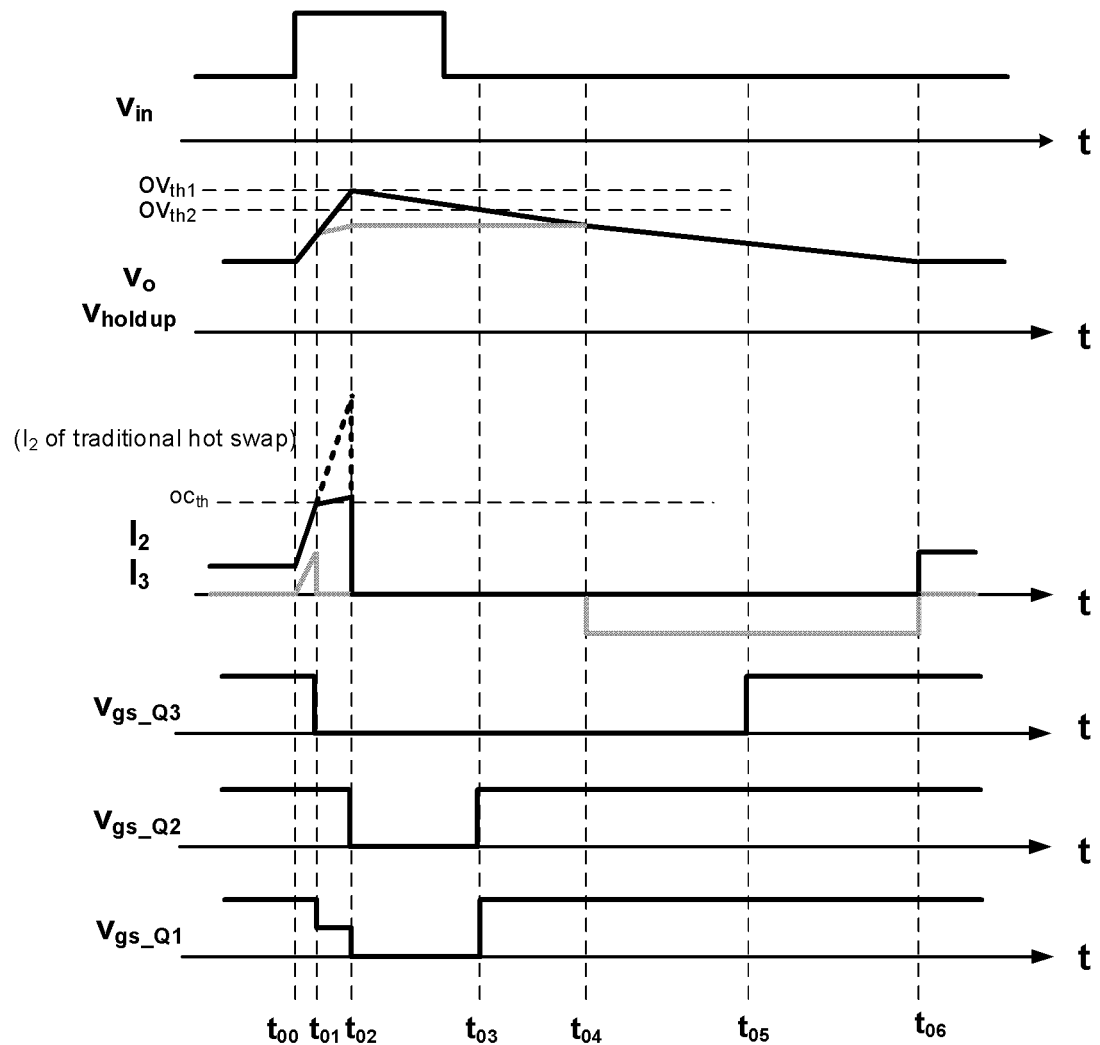
FIG. 4 schematically shows an exemplary operating timing sequence diagram of a power supply assisting sub-system included in the power supply system of FIG. 3, in a case that OC occurs first and in turn leads to OV.

FIG. 4 schematically shows an exemplary operating timing sequence diagram of the power supply assisting sub-system 301 included in the power supply system 30 of FIG. 3, in a case that OC occurs first and in turn leads to OV, before which the power supply of the power supply system 30 is normal, as described previously with reference to FIG. 2.

In this case, a technical solution provided by the embodiment of the present disclosure mainly consists in that the third transistor $Q_3$ is turned off to suppress the current $I_2$ flowing through the second transistor $Q_2$, if the current $I_2$ flowing through the second transistor $Q_2$ is not smaller than a preset OC threshold, i.e., an OCP threshold for surge current; and is kept off for a first predetermined period $T_1$ since the current $I_2$ flowing through the second transistor $Q_2$ is smaller than the preset OC threshold, wherein the first predetermined period $T_1$ comprises a hiccup period of OCP; and is turned on when the first predetermined period $T_1$ is expired;

alternatively, if a voltage across the capacitor $C_o$ is not smaller than a first preset OV threshold, the first transistor $Q_1$ and the second transistor $Q_2$ are turned off respectively, and a signal for sensing the voltage difference (denoted as $V_{ds}$) between the input voltage $V_{in}$ and a voltage (denoted as $V_{holdup}$) across the capacitor $C_{holdup}$ is disabled; and if the voltage across the capacitor $C_o$ is not larger than a second preset OV threshold, the first transistor $Q_1$ and the second transistor $Q_2$ are turned on respectively, wherein the second preset OV threshold is smaller than the first OV threshold;

wherein the signal sensing the voltage difference $V_{ds}$ is enabled when a second predetermined period $T_2$ since the second transistor is controlled to be turned on is expired, wherein the second predetermined period $T_2$ is a period for the capacitor $C_{holdup}$ being fully charged by the current $I_2$ flowing through the second transistor $Q_2$.

With reference to FIG. 4, the exemplary operating timing sequence of the power supply assisting sub-system 301 according to the embodiment of the present disclosure is described below in detail.

$t_{00}$: Overshoot of $V_{in}$ or $I_{in}$ occurs, or the power supply assisting sub-system 301 works in the hiccup mode.

$t_{00}$~$t_{01}$: The current $I_2$ flowing through the second transistor $Q_2$ is rapidly increased until a preset OC threshold $OC_{th}$ at $t_{01}$. Meanwhile, the voltage, denoted as $V_o$, across the capacitor $C_o$ and the voltage $V_{holdup}$ across the capacitor $C_{holdup}$ are increased together, wherein $V_o$=$V_{holdup}$.

$t_{01}$: When the current $I_2$ is not smaller than the preset OC threshold $OC_{th}$, i.e., OC occurs, the third transistor $Q_3$ is configured to be turned off by the control signal $V_{gs3}$ in e.g. a low level at the control terminal of the third transistor $Q_3$.

$t_{01}$~$t_{02}$: The current $I_2$ flowing through the second transistor $Q_2$ is suppressed, since only the capacitor $C_o$ is charged by the current $I_2$ flowing through the second transistor $Q_2$, and the capacitor $C_{holdup}$ is linear charged by the current $I_1$ flowing through the first transistor $Q_1$ in the linear mode which is controlled by the control signal $V_{gs1}$ in e.g. a middle level. As the capacitor $C_o$ is charged by the current $I_2$, the voltage $V_o$ across the capacitor $C_o$ is continuously increased until a first preset OV threshold, denoted as $OV_{th1}$, (i.e., a first OVP threshold) at $t_{02}$. As the capacitor $C_{holdup}$ is linear charged by the current $I_1$ which is smaller than $I_2$, the voltage $V_{holdup}$ across the capacitor $C_{holdup}$ is continuously increased, but is slower than $V_o$.

$t_{02}$: When the voltage $V_o$ across the capacitor $C_o$ is not smaller than the first preset OV threshold $OV_{th1}$, i.e., OV due to OC occurs, the first transistor $Q_1$ and the second transistor $Q_2$ are configured to be turned off respectively by respective control signals $V_{gs1}$ and $V_{gs2}$ e.g. in a low level at the control terminals of the first transistor $Q_1$ and the second transistor $Q_2$. At the same time, the signal $V_{ds}$ s for sensing the voltage difference $V_{ds}$ is disabled, so that the second transistor $Q_2$ can be turned on rapidly without being subject to the control of $V_{ds}$<$V_{ds\_th}$.

$t_{02}$~$t_{03}$: The voltage $V_o$ across the capacitor $C_o$ which is larger than the voltage $V_{holdup}$ across the capacitor $C_{holdup}$ is decreased until a second preset OV threshold, denoted $OV_{th2}$, (i.e., a second OVP threshold) at $t_{03}$, since the capacitor $C_o$ supplies power (discharges) to the load circuit 31.

$t_{03}$: When the voltage $V_o$ across the capacitor $C_o$ is not larger than the second preset OV threshold $OV_{th2}$, the first transistor $Q_1$ and the second transistor $Q_2$ are configured to be turned on respectively by the respective control signals $V_{gs1}$ and $V_{gs2}$ e.g. in a high level at the control terminals of the first transistor $Q_1$ and the second transistor $Q_2$, wherein the second preset OV threshold $OV_{th2}$ is smaller than the first OV threshold $OV_{th1}$.

$t_{03}$~$t_{04}$: Since $V_{in}$ has resumed to be normal, and the voltage $V_o$ across the capacitor $C_o$ is still larger than the voltage $V_{holdup}$ across the capacitor $C_{holdup}$, which is also larger than $V_{in}$, the capacitor $C_o$ continuously supplies power (discharges) to the load circuit 31, until $V_o$ is reduced to be equal to $V_{holdup}$ at $t_{04}$.

$t_{04}$~$t_{05}$. Since $V_{holdup}=V_o>V_{in}$, both $C_{holdup}$ and $C_o$ supply power (discharge) to the load circuit 31, wherein $C_{holdup}$ provides a current ($I_3$) through the body diode of the third transistor $Q_3$ during $Q_3$ is off (Here, $I_3$ is negative since $V_{holdup}=V_o>V_{in}$). Thus, $V_o=V_{holdup}$ is continuously decreased.

$t_{05}$: the third transistor $Q_3$ is turned on by the control signal $V_{gs3}$ in e.g. a high level at the control terminal of the third transistor Q3, when a first predetermined period $T_1$ since the current $I_2$ flowing through the second transistor $Q_2$ is smaller than the preset OC threshold $OC_{th}$ (i.e., the third transistor $Q_3$ is turned off) is expired. Here, $T_1=t_{05}-t_{01}$. Preferably, $T_1$ may be predetermined to include a hiccup period of OCP.

$t_{05}$~$t_{06}$: Since $V_{holdup}=V_o>V_{in}$, both $C_{holdup}$ and $C_o$ supply power (discharge) to the load circuit 31, wherein $C_{holdup}$ provides the current $I_3$ through the third transistor $Q_3$ during $Q_3$ is on ($I_3$ is kept negative since $V_{holdup}=V_o>V_{in}$). Thus, $V_o=V_{holdup}$ is continuously decreased until $V_{in}$ at $t_{06}$.

$t_{06}$: $V_o=V_{holdup}=V_{in}$. Thus, the load circuit 31 is resumed to be power supplied by the current $I_2$ flowing through the second transistor $Q_2$, and $I_3$ becomes 0.

Here, the signal $V_{ds\_s}$ is enabled when a second predetermined period $T_2$ since the second transistor $Q_2$ is controlled to be turned on (i.e., the second transistor Q2 is turned on at $t_{03}$) is expired. Preferably, $T_2$ is a period for the capacitor $C_{holdup}$ being fully charged by the current $I_2$ flowing through the second transistor $Q_2$.

Figure 5:
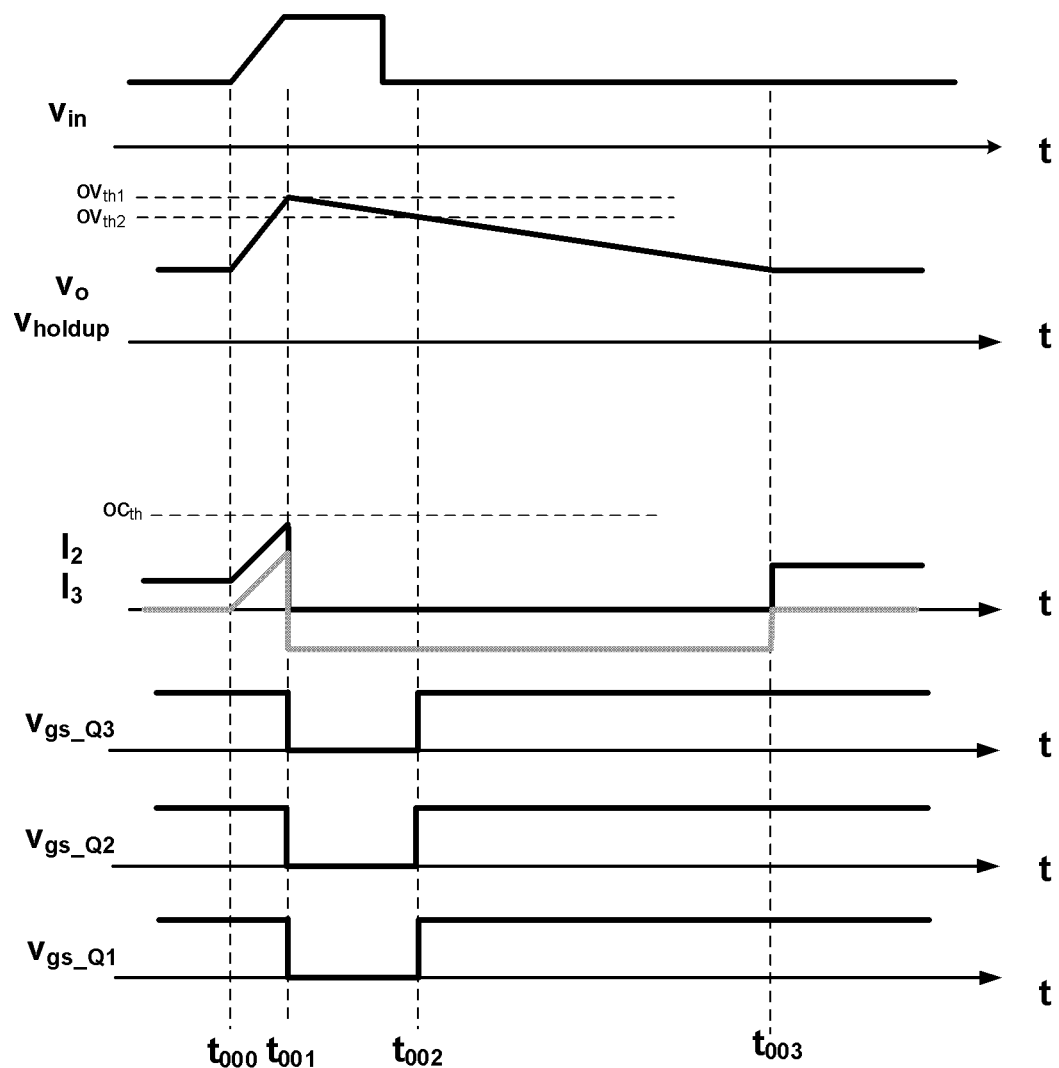
FIG. 5 schematically shows another exemplary operating timing sequence diagram of a power supply assisting sub-system included in the power supply system of FIG. 3, in a case that OV occurs.

FIG. 5 schematically shows an exemplary operating timing sequence diagram of the power supply assisting sub-system 301 included in the power supply system 30 of FIG. 3, in a case that OV occurs which necessarily leads to OC, before which the power supply of the power supply system 30 is normal, as described previously with reference to FIG. 2.

In this case, a technical solution provided by the embodiment of the present disclosure mainly consists in that if a voltage $V_o$ across the capacitor $C_o$ is not smaller than a first preset OV threshold, the first transistor $Q_1$, the second transistor $Q_2$ and the third transistor $Q_3$ are turned off respectively, and a signal for sensing the voltage difference (denoted as $V_{ds}$) between the input voltage $V_{in}$ and a voltage (denoted as $V_{holdup}$) across the capacitor $C_{holdup}$ is disabled; and if the voltage $V_o$ across the capacitor $C_o$ is not larger than a second preset OV threshold, the first transistor $Q_1$, the second transistor $Q_2$ and the third transistor $Q_3$ are turned on respectively, wherein the second preset OV threshold is smaller than the first OV threshold;

wherein the signal sensing the voltage difference $V_{ds}$ is enabled when a second predetermined period $T_2$ since the second transistor is controlled to be turned on is expired, wherein the second predetermined period $T_2$ is a period for the capacitor $C_{holdup}$ being fully charged by the current $I_2$ flowing through the second transistor $Q_2$.

With reference to FIG. 5, the exemplary operating timing sequence of the power supply assisting sub-system 301 according to the embodiment of the present disclosure is described below in detail.

$t_{000}$: Overshoot of $V_{in}$ or $I_{in}$ occurs, or the power supply assisting sub-system 301 works in the hiccup mode.

$t_{000}$~$t_{001}$: The voltage $V_o$ across the capacitor $C_o$ and the voltage $V_{holdup}$ across the capacitor $C_{holdup}$ are increased until a first preset OV threshold $OV_{th1}$ at $t_{001}$, wherein $V_o=V_{holdup}$. Meanwhile, the current $I_2$ flowing through the second transistor $Q_2$ is increased rapidly.

$t_{001}$: When the voltage $V_o$ across the capacitor $C_o$ is not smaller than the first preset OV threshold $OV_{th1}$, i.e., OV occurs, the first transistor $Q_1$, the second transistor $Q_2$, and the third transistor $Q_3$ are configured to be turned off respectively by respective control signals $V_{gs1}$, $V_{gs2}$ and $V_{gs3}$ e.g. in a low level at the control terminals of the first transistor $Q_1$, the second transistor $Q_2$, and the third transistor $Q_3$. At the same time, the signal $V_{ds\_s}$ for sensing the voltage difference $V_{ds}$ is disabled, so that the second transistor $Q_2$ can be turned on rapidly without being subject to the control of $V_{ds}<V_{ds\_th}$.

$t_{001}$~$t_{002}$: Since $V_{holdup}=V_o>V_{in}$, both $C_{holdup}$ and $C_o$ supply power (discharge) to the load circuit 31, wherein $C_{holdup}$ provides a current ($I_3$) through the body diode of the third transistor $Q_3$ during $Q_3$ is off (Here, $I_3$ is negative since $V_{holdup}=V_o>V_{in}$). Thus, $V_o=V_{holdup}$ is continuously decreased until a second preset OV threshold $OV_{th2}$ at $t_{002}$.

$t_{002}$: When the voltage $V_o$ across the capacitor $C_o$ is not larger than the second preset OV threshold $OV_{th2}$, the first transistor $Q_1$, the second transistor $Q_2$ and the third transistor $Q_3$ are configured to be turned on respectively by the respective control signals $V_{gs1}$, $V_{gs2}$ and $V_{gs3}$ e.g. in a high level at the control terminals of the first transistor $Q_1$, the second transistor $Q_2$ and the third transistor $Q_3$, wherein the second preset OV threshold $OV_{th2}$ is smaller than the first OV threshold $OV_{th1}$.

$t_{002}$~$t_{003}$: Since $V_{in}$ has resumed to be normal, and $V_{holdup}=V_o>V_{in}$, both $C_{holdup}$ and $C_o$ supply power (discharge) to the load circuit 31, wherein $C_{holdup}$ provides the current $I_3$ through the third transistor $Q_3$ during $Q_3$ is on (13 is kept negative since $V_{holdup}=V_o>V_{in}$). Thus, $V_o=V_{holdup}$ is continuously decreased until $V_{in}$ at $t_{003}$.

$t_{003}$: $V_o=V_{holdup}=V_{in}$. Thus, the load circuit 31 is resumed to be power supplied by the current $I_2$ flowing through the second transistor $Q_2$, and $I_3$ becomes 0.

Here, the signal $V_{ds\_s}$ is enabled when a second predetermined period $T_2$ since the second transistor $Q_2$ is controlled to be turned on (i.e., the second transistor $Q_2$ is turned on at $t_{002}$) is expired. Preferably, $T_2$ is a period for the capacitor $C_{holdup}$ being fully charged by the current $I_2$ flowing through the second transistor $Q_2$.

In connection with FIGS. 4 and 5, the power supply assisting sub-system 301 included in the power supply system 30 of FIG. 3 may well suppress the surge current especially flowing through the second transistor $Q_2$.

Hereinafter, a method of operating the power supply system 30 according to an embodiment of the present disclosure will be described in detail in conjunction with FIG. 6, which schematically shows an exemplary flowchart of a method of operating the power supply system 30 according to an embodiment of the present disclosure.

The structure of the power supply system 30 has been described in detail and the exemplary operating timing sequence diagrams of the power supply assisting sub-system 301 included in the power supply system 30 have been described in conjunction with FIGS. 3~5, and detailed description thereof may be referred to, which thus will not be described here for simplicity.

Figure 6:
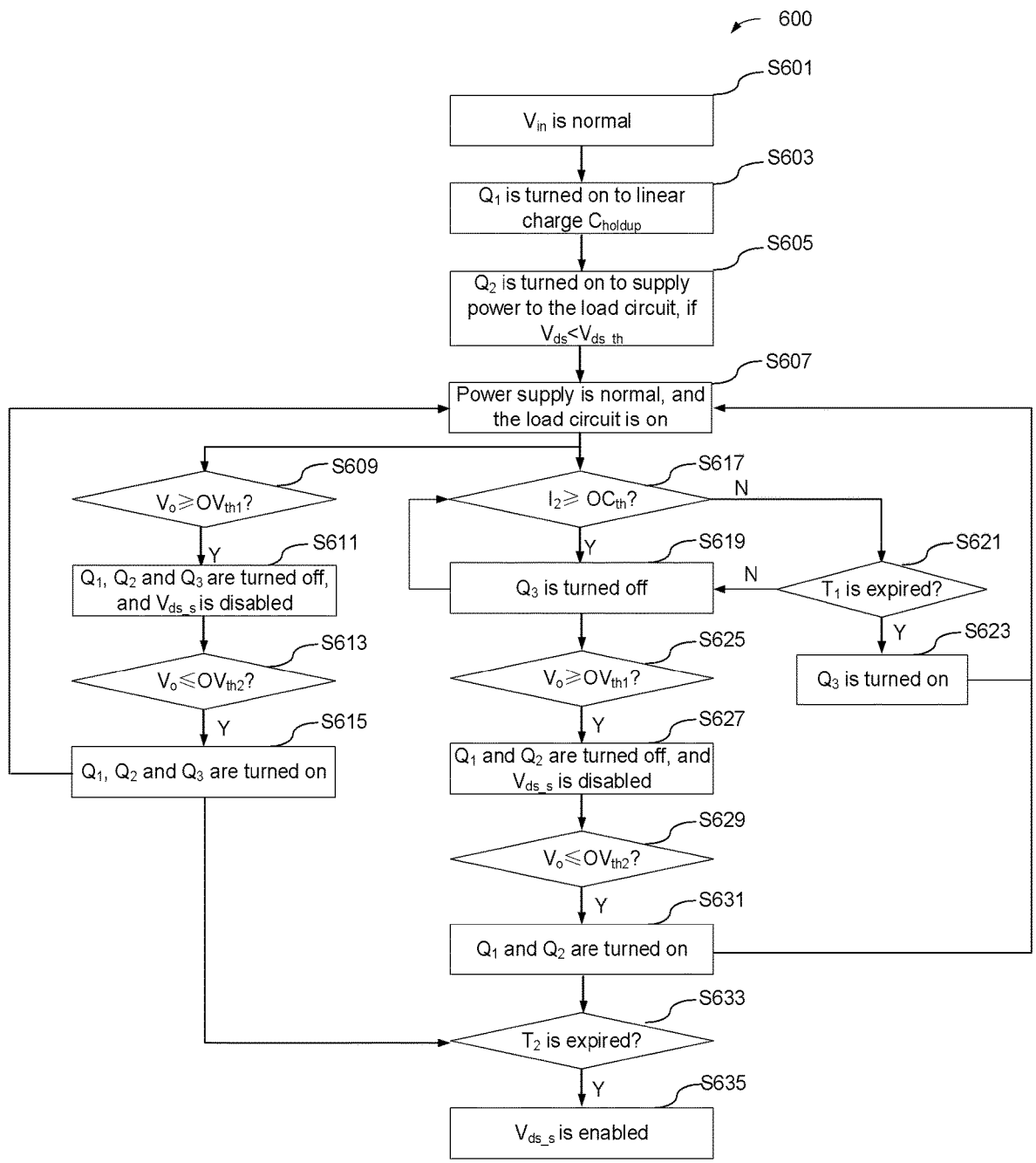
FIG. 6 schematically shows an exemplary flowchart of a method of operating the power supply system of FIG. 3 according to an embodiment of the present disclosure.

As shown in FIG. 6, in step S601, the power supply system 30 starts to supply power to the communication device, and the input voltage $V_{in}$ is normal.

In step S603, the first transistor $Q_1$ is configured to be turned on by the control signal $V_{gs1}$ in e.g. a middle level (which causes the transistor $Q_1$ to operate in the linear mode) at the control terminal of the first transistor $Q_1$ to charge the capacitor $C_{holdup}$, like the process during $t_1$~$t_2$ as shown in FIG. 2.

In step S605, the voltage difference $V_{ds}$ between the input voltage $V_{in}$ and a voltage, denoted as $V_{holdup}$, across the capacitor $C_{holdup}$ is smaller than the preset voltage threshold $V_{ds\_th}$, the second transistor $Q_2$ is configured to be turned on by the control signal ($V_{gs2}$) in a high level at the control terminal of the second transistor $Q_2$ to supply power to the load circuit 31, like the process during $t_2 \sim t_3$ as shown in FIG. 2.

In step S607, the power supply of the power supply system 30 is normal with the assistance of the power supply assisting sub-system 301, and thus a signal indicating power good is sent out, like $t_3$ as shown in FIG. 2. Accordingly, after a shorter delay at $t_4$ as shown in FIG. 2, the load circuit 31 of the communication device works normally under the good power supply of the power supply system 30 with the assistance of the power supply assisting sub-system 301.

In connection with FIG. 5, once OV occurs due to overshoot of $V_{in}$ or $I_{in}$ occurs or the power supply assisting sub-system 301 working in the hiccup mode, the voltage $V_o$ across the capacitor $C_o$ and the voltage $V_{holdup}$ across the capacitor $C_{holdup}$ are increased.

It is thus determined in step S609 whether the voltage $V_o$ across the capacitor $C_o$ is not smaller than the first preset OV threshold $OV_{th1}$, i.e., OV occurs.

If so ('Y' from S609), the method proceeds to step S611, in which the first transistor $Q_1$, the second transistor $Q_2$, and the third transistor $Q_3$ are configured to be turned off at $t_{o01}$ respectively by respective control signals $V_{gs1}$, $V_{gs2}$ and $V_{gs3}$ e.g. in a low level at the control terminals of the first transistor $Q_1$, the second transistor $Q_2$, and the third transistor $Q_3$, and the signal $V_{ds\_s}$ for sensing the voltage difference $V_{ds}$ is disabled, so that the second transistor $Q_2$ can be turned on rapidly without being subject to the control of $V_{ds}<V_{ds\_th}$.

It is determined in step S613 whether the voltage $V_o$ across the capacitor $C_o$ is not larger than the second preset OV threshold $OV_{th2}$.

If so ('Y' from S613), the method proceeds to step S615, in which the first transistor $Q_1$, the second transistor $Q_2$ and the third transistor $Q_3$ are configured to be turned on at $t_{o02}$ respectively by the respective control signals $V_{gs1}$, $V_{gs2}$ and $V_{gs3}$ e.g. in a high level at the control terminals of the first transistor $Q_1$, the second transistor $Q_2$ and the third transistor $Q_3$, wherein the second preset OV threshold $OV_{th2}$ is smaller than the first OV threshold $OV_{th1}$.

Then, the method goes back to step S607, in which the load circuit 31 is resumed to work normally under the good power supply of the power supply system 30 with the assistance of the power supply assisting sub-system 301.

Preferably, when the second transistor $Q_2$ is controlled to be turned on (i.e., the second transistor $Q_2$ is turned on at $t_{o02}$), a timer for a predetermined period $T_2$ is started. Preferably, $T_2$ is a period for the capacitor $C_{holdup}$ being fully charged by the current $I_2$ flowing through the second transistor $Q_2$.

Then, it is determined in step S633 whether the timer for $T_2$ is expired.

If so ('Y' from S633), the signal $V_{ds\_s}$ is enabled so that On/OFF of the second transistor $Q_2$ is triggered by the voltage difference $V_{ds}$ ($=V_{in}-V_{holdup}$). As previously described, if $V_{ds}<V_{ds\_th}$, the second transistor $Q_2$ is controlled to be turned on, and vice versa.

In connection with FIG. 4, once OC occurs due to overshoot of $V_{in}$ or $I_{in}$ occurs or the power supply assisting sub-system 301 working in the hiccup mode, the current $I_2$ flowing through the second transistor $Q_2$ is rapidly increased; meanwhile, the voltage $V_o$ across the capacitor $C_o$ and the voltage $V_{holdup}$ across the capacitor $C_{holdup}$ are increased together, wherein $V_o=V_{holdup}$.

It is thus determined in step S617 whether the current $I_2$ is not smaller than the preset OC threshold $OC_{th}$, i.e., OC occurs.

If so ('Y' from S617), the method proceeds to step S619, in which the third transistor $Q_3$ is configured to be turned off at $t_{o1}$ by the control signal $V_{gs3}$ in e.g. a low level at the control terminal of the third transistor $Q_3$.

The current $I_2$ flowing through the second transistor $Q_2$ is thus suppressed, since only the capacitor $C_o$ is charged by the current $I_2$ flowing through the second transistor $Q_2$, and the capacitor $C_{holdup}$ is linear charged by the current $I_1$ flowing through the first transistor $Q_1$ in the linear mode which is controlled by the control signal $V_{gs1}$ in e.g. a middle level.

Preferably, if the current $I_2$ is smaller than the preset OC threshold $OC_{th}$ ('N' from S617), a timer for a predetermined period $T_1$ is started. Preferably, $T_1$ may be predetermined to include a hiccup period of OCP.

Then, it is determined in step S621 whether the timer for $T_1$ is expired.

If so ('Y' from S621), the third transistor $Q_3$ is controlled to be turned on in step S623.

In some case, after the third transistor $Q_3$ is controlled to be turned on, the method goes back to step S607, in which the load circuit 31 is resumed to work normally under the good power supply of the power supply system 30 with the assistance of the power supply assisting sub-system 301.

On the other hand, as previously described, the current $I_2$ flowing through the second transistor $Q_2$ is thus suppressed, since only the capacitor $C_o$ is charged by the current $I_2$ flowing through the second transistor $Q_2$, and the capacitor $C_{holdup}$ is linear charged by the current $I_1$ flowing through the first transistor $Q_1$ in the linear mode which is controlled by the control signal $V_{gs1}$ in e.g. a middle level. As the capacitor $C_o$ is charged by the current $I_2$, the voltage $V_o$ across the capacitor $C_o$ is continuously increased until a first preset OV threshold, denoted as $OV_{th1}$, (i.e., a first OVP threshold) at $t_{o2}$. That is, the OC leads to OV. Here, as the capacitor $C_{holdup}$ is linear charged by the current $I_1$ which is smaller than $I_2$, the voltage $V_{holdup}$ across the capacitor $C_{holdup}$ is continuously increased, but is slower than $V_o$.

It is thus further determined in step S625 whether the voltage $V_o$ across the capacitor $C_o$ is not smaller than the first preset OV threshold $OV_{th1}$, i.e., OV due to OC occurs.

If so ('Y' from S625), the method proceeds to step S627, in which the first transistor $Q_1$ and the second transistor $Q_2$ are configured to be turned off at $t_{o2}$ respectively by respective control signals $V_{gs1}$ and $V_{gs2}$ e.g. in a low level at the control terminals of the first transistor $Q_1$ and the second transistor $Q_2$. At the same time, the signal $V_{ds\_s}$ for sensing the voltage difference $V_{ds}$ is disabled, so that the second transistor $Q_2$ can be turned on rapidly without being subject to the control of $V_{ds}<V_{ds\_th}$.

Then, the voltage $V_o$ across the capacitor $C_o$ which is larger than the voltage $V_{holdup}$ across the capacitor $C_{holdup}$ is decreased, since the capacitor $C_o$ supplies power (discharges) to the load circuit 31.

It is thus determined in step S629 whether the voltage $V_o$ across the capacitor $C_o$ is not larger than the second preset OV threshold $OV_{th2}$.

If so ('Y' from S629), the method proceeds to step S631, in which the first transistor $Q_1$ and the second transistor $Q_2$ are configured to be turned on at $t_{o3}$ respectively by the respective control signals $V_{gs1}$ and $V_{gs2}$ e.g. in a high level at the control terminals of the first transistor $Q_1$ and the second transistor $Q_2$, wherein the second preset OV threshold $OV_{th2}$ is smaller than the first OV threshold $OV_{th1}$.

Then, the method goes back to step S607, in which the load circuit 31 is resumed to work normally under the good power supply of the power supply system 30 with the assistance of the power supply assisting sub-system 301.

Preferably, when the second transistor $Q_2$ is controlled to be turned on (i.e., the second transistor $Q_2$ is turned on at $t_{o3}$), a timer for a predetermined period $T_2$ is started. Preferably, $T_2$ is a period for the capacitor $C_{holdup}$ being fully charged by the current $I_2$ flowing through the second transistor $Q_2$.

Then, it is determined in step S633 whether the timer for $T_2$ is expired.

If so ('Y' from S633), the signal $V_{ds\_s}$ is enabled so that On/OFF of the second transistor $Q_2$ is triggered by the voltage difference $V_{ds}$ ($=V_{in}-V_{holdup}$). As previously described, if $V_{ds}<V_{ds\_th}$, the second transistor $Q_2$ is controlled to be turned on, and vice versa.

The above technical solutions of the embodiments according to the present disclosure may achieve at least the following beneficial technical effects:
- the surge current during both powering on and normal operation period can be suppressed;
- smaller SOA FETs can be used to reduce cost; and
- OVP and OCP functions can be added more reliably.

The present disclosure has been described with reference to embodiments and drawings. It should be understood that various modifications, alternations and additions can be made by those skilled in the art without departing from the spirits and scope of the disclosure. Therefore, the scope of the present disclosure is not limited to the above particular embodiments but only defined by the claims as attached and equivalents thereof.

The invention claimed is:

1. A power supply system, comprising:
a power source connected between a first node and a second node for applying an input voltage;
a first circuit, connected between the first node and a second circuit; and configured to suppress oscillation caused by load variation of a load circuit that is connected between the first node and the second circuit, and to supply power to the load circuit when the power source is temporarily off;
the second circuit, having a first port connected to the first circuit, a second port connected to the load circuit, and a third port connected to the second node; and configured to charge the first circuit and supply power to the load circuit; and
a third circuit, connected between the first circuit and the load circuit; and configured to suppress a current flowing into the second circuit.

2. The power supply system according to claim 1, further comprising:
a fourth circuit, connected between the first node and the load circuit, and configured to filter interference to the load circuit.

3. The power supply system according to claim 2, wherein the first circuit comprises a first capacitor, having a first electrode connected to the first node and a second electrode connected to the first port of the second circuit, wherein the fourth circuit filtering interference to the load circuit comprises a second capacitor, having a third electrode connected to the first node and a fourth electrode connected to the second port of the second circuit.

4. The power supply system according to claim 1, wherein the second circuit comprises:
a first transistor, having a first control terminal, a first terminal connected to the second node via a first resistor, and a second terminal, as the first port, connected to the second electrode of a first capacitor;
a second transistor, having a second control terminal, a third terminal connected to the second node via a second resistor, and a fourth terminal, as the second port, connected to the load circuit;
the first resistor connected between the second node and a fifth terminal of the first transistor; and
the second resistor connected between the second node and a fifth terminal of the second transistor,
wherein the first resistor has a resistance larger than that of the second resistor.

5. The power supply system according to claim 4, wherein the third circuit comprises a third transistor, having a third control terminal, a seventh terminal connected to a eighth terminal of the second transistor, and a second terminal connected to the second electrode of the first capacitor.

6. The power supply system according to claim 5, wherein the control terminals of the first transistor, the second transistor, and the third transistor respectively correspond to gate electrodes of the first transistor, the second transistor, and the third transistor;
the first control terminal of each of the first transistor, the second transistor, and the third transistor corresponds to one of a source electrode and a drain electrode of the corresponding one of the first transistor, the second transistor, and the third transistor; and
the second control terminal of each of a charging second circuit, the second transistor, and the third transistor corresponds to another of the source electrode and the drain electrode of the corresponding one of the first transistor, the second transistor, and the third transistor.

7. The power supply system according to claim 5, wherein the first transistor, the second transistor, and the third transistor are N-type transistors, each configured to be turned on by a high level control signal at the first control terminal, second control terminal, and third control terminal, and turned off by a low level control signal at the corresponding first control terminal, second control terminal, or third control terminal; or
the first transistor, the second transistor, and the third transistor are P-type transistors, each configured to be turned on by a low level control signal at the first control terminal, second control terminal, and third control terminal, and turned off by a high level control signal at the corresponding first control terminal, second control terminal, or third control terminal.

8. The power supply system according to claim 4, wherein the first transistor is configured to be turned on by a control signal at the first control terminal of the first transistor to charge the first capacitor, when the input voltage is normal; and
the second transistor is configured to be turned on by a control signal at the second control terminal of the second transistor to supply power to the load circuit, if a voltage difference between the input voltage and a voltage across the first capacitor is smaller than a preset voltage threshold.

9. The power supply system according to claim 5, wherein the third transistor is configured to be turned off by a control signal at the third control terminal of the third transistor to suppress a current flowing through the second transistor, if the current flowing through the second transistor is not smaller than a preset Over-Current 'OC' threshold.

10. The power supply system according to claim 9, wherein the third transistor is kept off for a first predetermined period since the current flowing through the second transistor is smaller than the preset OC threshold; and is turned on by the control signal at the third control terminal of the third transistor when the first predetermined period is expired; the first predetermined period comprises a hiccup period of Over-Current Protection 'OCP'.

11. The power supply system according to claim 9, wherein if a voltage across a second capacitor is not smaller than a first preset Over-Voltage 'OV' threshold, the first transistor and the second transistor are configured to be turned off respectively by respective control signals at the control terminals of the first transistor and the second transistor, and a signal for sensing the voltage difference is disabled.

12. The power supply system according to claim 11, wherein if the voltage across the second capacitor is not larger than a second preset OV threshold (OVth2), the first transistor and the second transistor are configured to be turned on respectively by the respective control signals at the control terminals of the first transistor and the second transistor, wherein the second preset OV threshold is smaller than the first OV threshold.

13. The power supply system according to claim 5, wherein if a voltage across a second capacitor is not smaller than a first preset Over-Voltage 'OV' threshold, the first transistor, the second transistor and the third transistor are configured to be turned off respectively by respective control signals at the control terminals of the first transistor, the second transistor and the third transistor, and a signal for sensing a voltage difference is disabled.

14. The power supply system according to claim 13, wherein if the voltage across the second capacitor is not larger than a second preset OV threshold, the first transistor, the second transistor, and the third transistor are configured to be turned on respectively by the respective control signals at the control terminals of the first transistor, the second transistor and the third transistor, wherein the second preset OV threshold is smaller than the first OV threshold.

15. The power supply system according to claim 12, wherein the respective control signal is enabled when a second predetermined period since the second transistor is controlled to be turned on is expired.

16. The power supply system according to claim 15, wherein the second predetermined period is a period for the first capacitor being fully charged by the current flowing through the second transistor.

17. A method of operating the power supply system according to claim 1, comprising:

turning on a first transistor by a control signal at a control terminal of the first transistor to charge a first capacitor, when the input voltage is normal; and turning on a second transistor by a control signal at a control terminal of the second transistor to supply power to the load circuit, if a voltage difference between the input voltage and a voltage across a first capacitor is smaller than a preset voltage threshold.

18. The method according to claim 17, further comprising:

turning off a third transistor by a control signal at a control terminal of the third transistor to suppress a current flowing through the second transistor, if the current flowing through the second transistor is not smaller than a preset Over-Current 'OC' threshold ('Y' from S617).

19. The method according to claim 18, further comprising:

keeping the third transistor off for a first predetermined period ('N' from S621) since the current flowing through the second transistor is smaller than the preset OC threshold ('N' from S617); and turning on the third transistor by the control signal at the control terminal of the third transistor when the first predetermined period is expired ('Y' from S621).

20. The method according to claim 19, wherein the first predetermined period comprises a hiccup period of Over-Current Protection 'OCP'.

* * * * *